United States Patent [19]

Scharboneau et al.

[11] Patent Number: 5,692,769

[45] Date of Patent: Dec. 2, 1997

[54] MODULAR STEERING WHEEL AND AIR BAG COMBINATION

[75] Inventors: Mark E. Scharboneau, Monroe; Gregory F. Exner, Woodhaven, both of Mich.

[73] Assignee: Breed Automotive Technology, Inc., Lakeland, Fla.

[21] Appl. No.: 522,627

[22] Filed: Sep. 1, 1995

[51] Int. Cl.⁶ ................................................ B60R 21/16
[52] U.S. Cl. ................... 280/728.2; 280/731; 74/552; 403/19; 403/320
[58] Field of Search ......................... 280/728.2, 731, 280/779; 74/552; 403/8, 19, 20, 320, 315; 411/315, 321

[56] References Cited

U.S. PATENT DOCUMENTS

| | | | |
|---|---|---|---|
| 3,264,019 | 8/1966 | Houvener et al. | 403/8 |
| 3,641,834 | 2/1972 | Barenyi . | |
| 3,984,126 | 10/1976 | Goetz et al. . | |
| 4,721,008 | 1/1988 | Stoops et al. . | |
| 4,934,735 | 6/1990 | Embach . | |
| 4,995,638 | 2/1991 | Shinto et al. . | |
| 5,188,000 | 2/1993 | Kaga . | |
| 5,265,905 | 11/1993 | Shelton . | |
| 5,350,190 | 9/1994 | Szigethy . | |
| 5,419,585 | 5/1995 | Breed et al. . | |
| 5,470,099 | 11/1995 | Williams . | |
| 5,470,100 | 11/1995 | Gordon . | |
| 5,584,503 | 12/1996 | Lutz | 280/731 |
| 5,615,910 | 4/1997 | Margetak et al. | 280/728.2 |

FOREIGN PATENT DOCUMENTS

| | | |
|---|---|---|
| 0414245 | 8/1990 | European Pat. Off. . |
| 0614787 | 2/1994 | European Pat. Off. . |
| 0655369A1 | 11/1994 | European Pat. Off. . |
| 2151937 | 4/1973 | France . |
| 0648661 | 10/1994 | France . |
| 0655370 | 11/1994 | France . |
| 4035975 | 5/1992 | Germany . |
| 9407807 | 5/1994 | Germany . |
| 2242871 | 10/1991 | United Kingdom . |
| 2282352 | 4/1995 | United Kingdom . |
| 9509745 | 4/1995 | WIPO . |

OTHER PUBLICATIONS

"Design of a One-Piece/ Air Bag cover", the thesis of Mark Scharboneau.

*Primary Examiner*—Paul N. Dickson
*Attorney, Agent, or Firm*—Richard & Howard

[57] ABSTRACT

A combined steering wheel and air bag modular unit is ultimately assembled. A cover is first molded around a steering wheel insert. The cover is molded as a single piece over the wheel and the area where the air bag module will be placed. In the past, two separate covers were utilized since the air bag was generally attached to the steering wheel after the steering wheel had been attached to the vehicle. The modular unit is then attached from the side to the vehicle steering column shaft. The present invention results in increased flexibility in the location of where manufacturing steps occur, and improves the aesthetic appearance of the cover for the steering wheel and air bag.

11 Claims, 2 Drawing Sheets

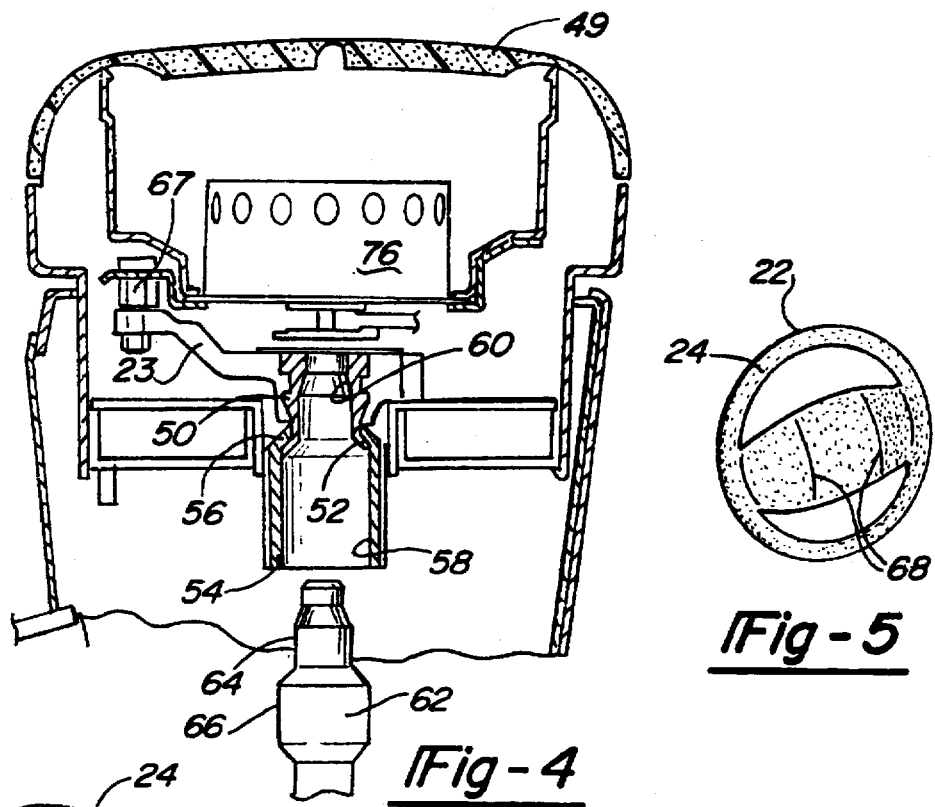
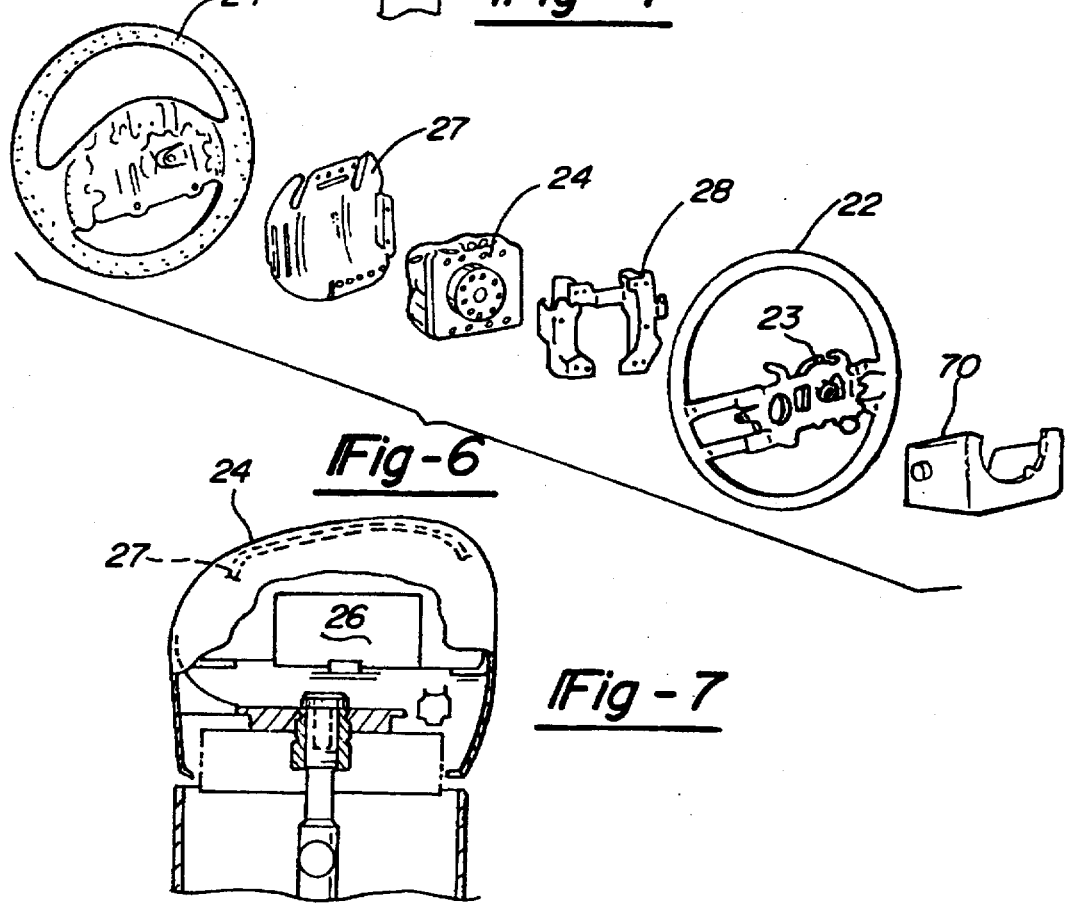

MODULAR STEERING WHEEL AND AIR BAG COMBINATION

BACKGROUND OF THE INVENTION

This invention relates to a combined steering wheel and air bag having a one-piece covering that is attached to the vehicle steering column after being assembled as a modular unit.

Modern vehicles typically come equipped with an air bag mounted in the vehicle steering wheel. The incorporation of the air bag into the vehicle steering wheel has required many changes in the design, manufacture and assembly of the steering wheel. As an example, the air bags typically include a cover that is separate from the steering wheel cover. The air bag cover is blown outwardly of the steering wheel when the air bag deploys. Air bags are often manufactured by a distinct manufacturer from the steering wheel. There is an effort made to have the air bag cover and the steering wheel cover be of the identical color and texture, unfortunately at times there have been some differences in the two covers.

Vehicle steering wheels are typically assembled by initially connecting a portion of the steering wheel to the steering column. The air bag is then assembled to the steering wheel, and the air bag cover is then placed on the steering wheel enclosing the air bag.

This prior art method of assembly has required that there be numerous parts stored and assembled at the vehicle assembly line. There is a desire to reduce the number of steps which occur at the final vehicle assembly line, and thus it would be desirable to achieve a combined steering wheel and air bag that may be assembled as a modular unit to the vehicle.

In the prior art, the steering wheel was necessarily first attached to the steering column. Once the air bag is assembled, there is no access to the attachment bolts which attach the steering wheel to the steering column. Thus, the steering wheel is initially attached, the air bag module including the air bag cover is then attached. The required sequence of these manufacturing steps undesirably limit the flexibility of the manufacturing processing.

SUMMARY OF THE INVENTION

In a disclosed embodiment of this invention, the steering wheel and air bag are assembled as a modular unit. The assembled modular unit is then attached to the steering column. Disclosed attachment methods allow attachment of the modular combined unit to the steering column even after the air bag has been attached to the steering wheel.

In one disclosed embodiment, the modular unit is connected to the steering column by a bolt accessible from outside of the steering column. The bolt has a bevel gear head, and a tool is inserted from the side to drive the bolt and lock the modular unit to the steering column.

In a second embodiment, the combined modular unit is placed on the steering column and a rotating nut is turned to draw the modular unit downwardly onto the steering column. Eventually, structure on the steering column is drawn into tight fitting relationship with the hub of the modular unit. The modular unit is thus locked on the steering column.

Moreover, since a combined air bag and steering wheel modular unit is achieved, a single cover may be utilized. The single cover over both the air bag and the steering wheel eliminates problems with different colors or textures to optimize fit and finish.

In a preferred embodiment of this invention, a portion of the cover is formed to tear from the remainder of the cover should the air bag deploy. In one example, tear seams are molded into the cover such that when the air bag deploys the cover over the air bag tears away from the remainder of the covering at the tear strips.

In preferred embodiments of this invention, the cover may be molded on the steering wheel through injection molding. Alternatively, reaction molding may be used. In either case, the molded one-piece cover extends over both the air bag and the steering wheel. After the cover is molded the air bag module is attached to the steering wheel and the modular unit is then attached to the steering column shaft.

These and other features of the present invention can be best understood from the following specification and drawings, of which the following is a brief description.

BRIEF DESCRIPTION OF THE DRAWINGS

FIG. 4 shows a second method of attaching the modular unit to the steering column.

FIG. 5 shows a detail of the one-piece cover of the present invention.

FIG. 6 is an exploded view of another embodiment within the scope of the present invention.

FIG. 7 is a cross-section through the embodiment of FIG. 6.

DETAILED DESCRIPTION OF A PREFERRED EMBODIMENT

Figure 1:
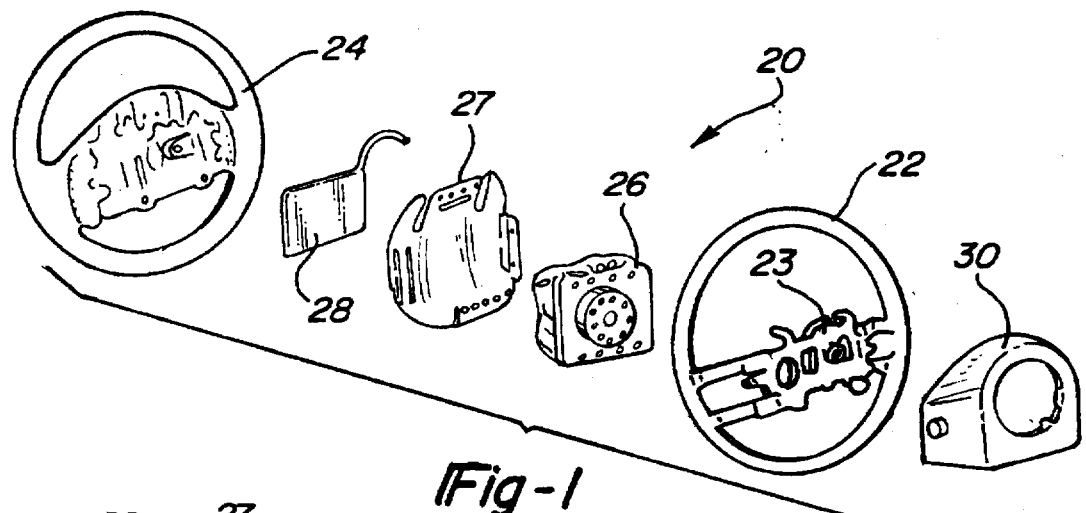
FIG. 1 is an exploded view of an inventive air bag and steering wheel modular unit.

FIG. 1 shows the components of a steering wheel and air bag modular unit 20. As shown, a steering wheel base 22 includes a hub 23 which supports the air bag. The hub 23 is also the portion attached to the steering column. Preferably, the hub 23 is formed from steel as a separate piece and the remainder of steering wheel base 22 is cast from magnesium around the hub 23. A cover 24 is integrally molded over the wheel base 22.

An air bag module 26 is shown as a one-piece item, although in reality it consists of several separate units. The air bag module itself is as known in the art and forms no portion of this invention. Moreover, the attachment of the module to hub 23 may be by known methods.

An inner substrate 27 provides a reaction surface adjacent the air bag such that the horn switch 28 may be depressed relative to the air bag module. The substrate is preferably injection molded from a thermoplastic and is secured to the air bag module. Other types of horn switches may be incorporated into the present invention, and the structure of the horn plate forms no portion of this invention. Cover 24 is first molded over the steering wheel 22, and over the area where the air bag module 26, will be received. The air bag module 26, inner substrate 27 and horn switch 28 then are all assembled on the hub 23. Since the steering wheel and air bag covers are molded as a single-piece, it has a uniform color and texture. This is an improvement over the prior art. A back cover 30 may be mounted onto the modular unit prior to the modular unit being attached to the vehicle, or may be a final assembly step after the modular unit has been attached to the vehicle steering column.

Figure 2:
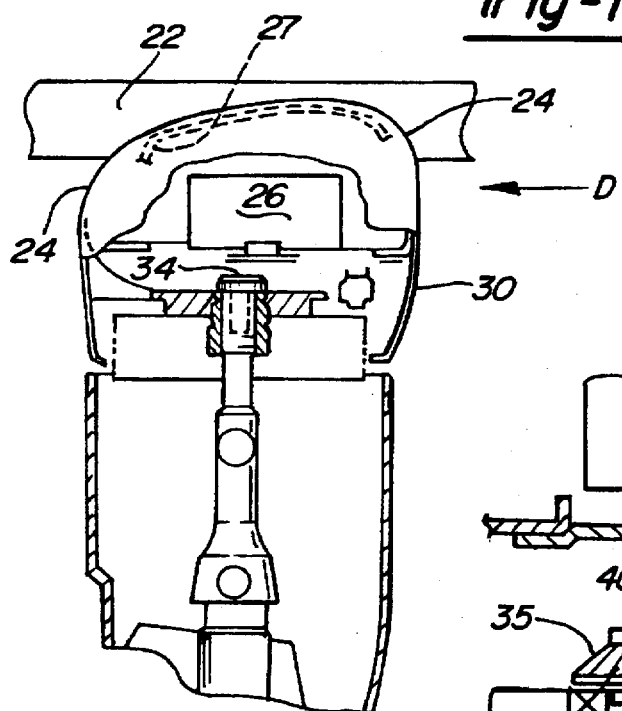
FIG. 2 is an assembled view of the modular unit shown in FIG. 1.

As shown in FIG. 2, the modular unit 20 incorporates the inner substrate 27 received just below the outer cover 24.

The cover 24 is molded to extend over the hub 23 when it is molded to the wheel base. The mold is designed to leave the space beneath the cover to receive the air bag module. FIG. 2 is a cross-section through the hub areas of the modular unit 20. The air bag module 26 is received beneath the substrate 27. The hub 23 is attached to a steering column 32 by a bolt 34. The back cover 30 encloses the portions of the modular unit 20. In the prior art providing access to the bolt 34 required that the steering wheel be attached to the steering column before the air bag was attached. This required the two separate covers.

In one aspect of this invention, the air bag may be attached to the modular unit by having the back cover extend upwardly a sufficient distance such that when the back cover is not received on the modular unit, there is space for the air bag module 26 to be brought in from the side of the assembly in the direction shown at arrow D. Thus, the bolt 34 is initially attached to the steering column 32, and the air bag assembly 26 is brought in from the side. In this way, the one-piece covering 24 may be utilized.

Figure 3:
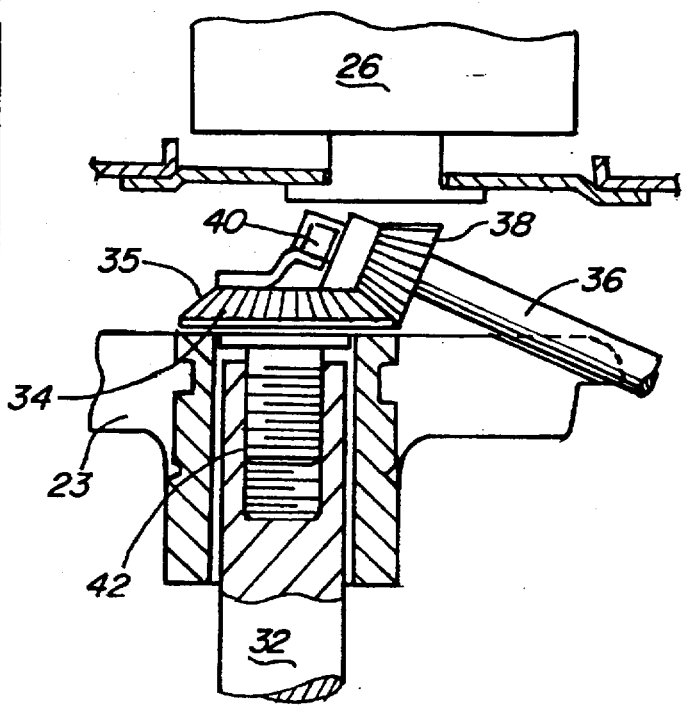
FIG. 3 shows a first method of attaching the modular unit to the steering column.

More preferably, the air bag unit is attached to the steering wheel and hub 23 prior to the steering wheel being attached to the steering column. One embodiment for accomplishing this attachment is shown in FIG. 3. As shown in FIG. 3, an air bag module 26 is already attached adjacent to hub 23. Hub 23 receives a bolt 34 having bevel gear teeth 35. A tool 36 extends in from the side of the modular unit 20, and includes a gear drive 38. A wire shield support 40 may support the tool 36 at an inner end. Tool 36 is rotated to turn gear 38. Gear 38 drives gear teeth 35 on the periphery of the head of drive bolt 34. Threads 42 on the bolt 34 are received within a threaded bore in steering column 32, thus pulling the modular steering wheel 20 down, and locking the modular unit to the steering column 32.

A second embodiment method of attachment is shown in FIG. 4. As shown in FIG. 4, the hub 23 includes a fixed hub portion 50 having a flange 52 securing a rotating hub 54. Air bag module 26 is bolted 67 to hub 23. Hub 54 has a flange 56 that prevents its movement beyond flange 52. Rotating hub 54 includes threads 58 at an inner peripheral surface. Fixed hub 50 includes a tapered mating section 60.

The steering column 62 includes a tapered portion 64 which is to be received within tapered mating portion 60. A threaded outer portion 66 is engaged on the threads 58, and draws the module 49 downwardly onto steering column 62.

Thus, the embodiment shown in FIG. 4 is assembled by initially assembling the steering wheel and cover to the air bag module, and other assembled parts. The combined modular unit is then attached to the steering column. Prior to attachment of the back cover, a tool is brought in from the side and drives the rotating hub 54 relative to the steering column 62. Threaded portion 58 engages threaded portion 66, and draws the modular unit downwardly onto the column 62. Eventually, tapered portions 62 are forced within tapered mating portion 60 and the modular unit 49 is secured on the steering column 62.

As shown in FIG. 5, the cover 24 is molded onto the steering wheel 22. The portion of the covering outwardly of the air bag 26, and inner substrate 24, includes tear seams 68. When the air bag deploys, the covering 24 will tear away from the remainder of the covering at the tear seams 68, allowing deployment of the air bag. The tear seams can be formed as a thin portion of the cover by appropriate structure in the mold.

FIG. 6 shows another embodiment wherein a half back cover 70 replaces the full back cover shown in the FIG. 1 embodiment. The half back cover provides access to the connection of the hub to the steering column from a greater area.

With the full back cover embodiment it may be necessary to have the back cover removed while the modular unit is being attached to the steering column. The back cover is then attached to the modular unit. With the half back cover, there may sufficient access such that the back cover may be pre-assembled to the modular unit.

A distinct type of horn switch is shown in this embodiment. Moreover, a distinct substrate 27 is also shown. As shown in FIG. 7, this substrate 27 extends around a greater area than the substrate shown in FIGS. 1 and 2. The FIG. 7 substrate is secured to the covering rather than the air bag module.

The cover 24 is preferably connected to the steering wheel 22 by molding the covering around the steering wheel base and over the area where the air bag module is received. The inner substrate may be placed on the steering wheel prior to the molding of the cover. Then, the air bag module and the horn switch are inserted under the cover and on the hub. The assembled modular unit is then connected to a steering column.

The molded covering is preferably an injection molding of a plastic, or could be reaction molding of a foam material such as urethane. Known materials as presently used for wheel or air bag covers may be utilized. If a foam material is utilized, some design consideration should be given to providing sufficient support in the area of the air bag. For this reason, the substrate shown in FIG. 7 may be used.

Finally, the invention disclosed in the application discloses several basic inventive ideas. The up to date details of those concepts are disclosed in a U.S. patent application titled "Modular Steering Wheel and Air Bag Combination", Ser. No. 08/547,493, filed Oct. 24, 1995, and owned by the assignee of this application.

A preferred embodiment of this invention has been disclosed, however, a worker of ordinary skill in the art would recognize that certain modifications would come within the scope of this invention. For that reason the following claims should be studied to determine the true scope and content of this invention.

We claim:

1. A modular steering wheel and air bag assembly comprising:

a steering wheel having a wheel portion to be gripped for operation of a vehicle and a hub portion to attach said steering wheel to a steering column of a vehicle;

an air bag module, said air bag module being received on said steering wheel and on a first side of said hub facing said wheel portion;

a one-piece cover, covering at least said wheel portion of said steering wheel and said air bag module, said one-piece cover covering a side of said air bag module remote from said hub; and attachment structure to attach the combined air bag module and said steering wheel to a steering column of a vehicle with said air bag module mounted on said hub of said steering wheel, said attachment structure including a threaded member formed with gear teeth to be engaged by a rotating member having mating structure for engaging said gear teeth and driving said gear teeth to rotate said threaded member and secure said hub to a steering column, said gear teeth positioned at a location between said air bag module and a second side of said hub which faces away from said wheel portion.

2. A modular assembly as recited in claim 1, wherein said one-piece cover is formed with structure to assist said cover in tearing at a location where said air bag module is received when said air bag module is deployed.

3. A modular assembly as recited in claim 2, wherein said cover is molded from a plastic material around said steering wheel.

4. A modular assembly as recited in claim 1, wherein said rotating member is a tool inserted adjacent to said threaded member, and said threaded member being formed with bevel gear teeth to engage said rotating member.

5. A modular assembly as recited in claim 1, wherein said threaded member is a bolt.

6. A modular assembly as recited in claim 1, wherein said rotating member is removable from said steering wheel when not driving said threaded member.

7. A combined modular steering wheel and air bag assembly comprising:

a steering wheel including a wheel portion to be gripped by an operator for operating the vehicle and a hub portion to attach said steering wheel to a steering column of a vehicle;

an air bag module secured to said steering wheel;

an attachment structure for attaching said steering wheel hub to a steering column of a vehicle with said air bag module already attached to said steering wheel; and said attachment structure including a threaded member for being driven into a mating threaded portion of the steering column to secure said steering wheel to the steering column shaft, said threaded member including gear teeth that are engaged with a rotating member to rotate said gear teeth and drive said threaded member to secure said threaded member to the steering column shaft, said gear teeth positioned at a location between said air bag module and a side of said hub which faces away from said wheel portion.

8. A modular unit as recited in claim 7, wherein said gear teeth are beveled gear teeth formed on a head of said bolt, and said second member is a tool inserted adjacent to said bolt to rotate said gear teeth.

9. A modular unit as recited in claim 7, wherein said attachment structure includes a rotating internally threaded member which rotates relative to said hub portion of said steering wheel, said rotating internally threaded member being adapted to be received on an externally-threaded portion of a steering column shaft for a vehicle.

10. A modular assembly as recited in claim 7, wherein said threaded member is a bolt.

11. A modular assembly as recited in claim 7, wherein said rotating member is removable from said steering wheel when not driving said threaded member.

* * * * *